US012576516B2

(12) United States Patent (10) Patent No.: US 12,576,516 B2
Wang et al. (45) Date of Patent: Mar. 17, 2026

(54) HUMAN SKILL BASED PATH GENERATION

(71) Applicant: FANUC CORPORATION, Yamanashi (JP)

(72) Inventors: Kaimeng Wang, Fremont, CA (US); Yu Zhao, Santa Clara, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 298 days.

(21) Appl. No.: 18/355,914

(22) Filed: Jul. 20, 2023

(65) Prior Publication Data

US 2025/0026008 A1 Jan. 23, 2025

(51) Int. Cl.
B25J 9/16 (2006.01)

(52) U.S. Cl.
CPC .............. B25J 9/161 (2013.01); B25J 9/163 (2013.01); B25J 9/1666 (2013.01)

(58) Field of Classification Search
CPC . B25J 9/161; B25J 9/163; B25J 9/1666; B25J 9/1664; B25J 9/1671; G05D 1/43; G05D 1/243; G05D 1/247; G05D 1/633; G05D 1/644
See application file for complete search history.

(56) References Cited

U.S. PATENT DOCUMENTS 5,488,353 A * 1/1996 Kawakami ............... A61B 5/18
340/576
5,769,085 A * 6/1998 Kawakami ............. A61B 5/024
600/519

10,800,429 B2 * 10/2020 Kimura ................. B60W 40/08
2005/0030184 A1 * 2/2005 Victor .................... B60K 28/06
340/576
2013/0222212 A1 * 8/2013 Lorenz ..................... B60Q 1/00
340/425.5
2014/0309864 A1 * 10/2014 Ricci ................... B60W 50/085
701/36

(Continued)

OTHER PUBLICATIONS

Ichter, Brian, James Harrison, and Marco Pavone. "Learning sampling distributions for robot motion planning." 2018 IEEE International Conference on Robotics and Automation (ICRA). IEEE, 2018.

*Primary Examiner* — Sihar A Karwan
(74) *Attorney, Agent, or Firm* — John A. Miller; Shumaker, Loop & Kendrick, LLP

(57) ABSTRACT

A method for robot path planning using skills extracted from human-taught motion programs applied to a new obstacle environment. A three-dimensional convolutional neural network is used to extract features characterizing an obstacle environment, where the feature vector representation of the obstacles overcomes problems encountered when using point cloud obstacle data. The obstacle feature data and robot path start and goal points are provided to an encoder/decoder neural network system which is trained to extract skills from a database of human-generated motion programs. The encoder/decoder neural network system produces a distribution of waypoints for the current obstacle environment and start/goal points. The distribution of waypoints is used to perform a final collision-free path generation using either a rapidly-exploring random tree (RRT) technique or an optimization-based technique.

19 Claims, 8 Drawing Sheets

(56)            References Cited

U.S. PATENT DOCUMENTS

| | | | |
|---|---|---|---|
| 2016/0068103 A1* | 3/2016 | McNew | B60W 50/0097 |
| | | | 701/23 |
| 2016/0121907 A1* | 5/2016 | Otake | B60W 10/20 |
| | | | 701/23 |
| 2017/0140232 A1* | 5/2017 | Banno | A61B 5/1122 |
| 2017/0240109 A1* | 8/2017 | Kimura | G08G 1/167 |
| 2017/0369075 A1* | 12/2017 | Hwang | B60W 50/14 |
| 2021/0298846 A1* | 9/2021 | Dozeman | A61B 90/03 |
| 2022/0063099 A1* | 3/2022 | Lin | B25J 9/1612 |
| 2022/0166957 A1* | 5/2022 | Ye | H04N 7/181 |
| 2023/0109223 A1* | 4/2023 | Wong | G06N 3/006 |
| | | | 700/255 |
| 2023/0410345 A1* | 12/2023 | Voiss | B25J 9/1694 |
| 2024/0075617 A1* | 3/2024 | Wu | B25J 9/1664 |
| 2024/0217103 A1* | 7/2024 | Gomez Gutierrez | B25J 9/1666 |

* cited by examiner

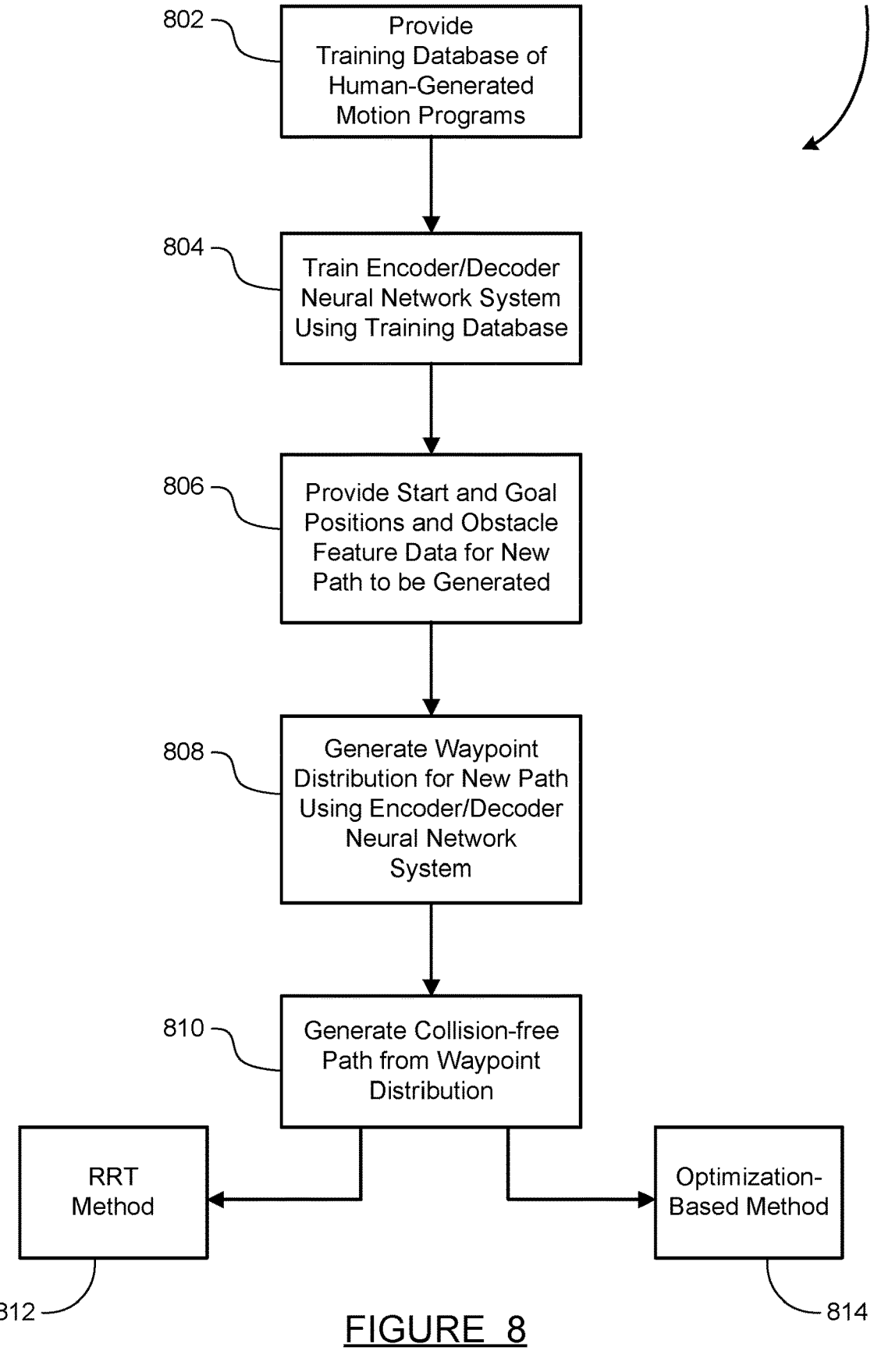

800

802 — Provide Training Database of Human-Generated Motion Programs

804 — Train Encoder/Decoder Neural Network System Using Training Database

806 — Provide Start and Goal Positions and Obstacle Feature Data for New Path to be Generated 808 — Generate Waypoint Distribution for New Path Using Encoder/Decoder Neural Network System 810 — Generate Collision-free Path from Waypoint Distribution RRT Method Optimization-Based Method

HUMAN SKILL BASED PATH GENERATION

BACKGROUND

Field

The present disclosure relates generally to the field of industrial robot motion programming and, more particularly, to a method for generating a path for a robot which uses a convolutional neural network to extract features characterizing an obstacle environment, an encoder/decoder neural network system to extract skills from a database of human-generated motion programs and produce a distribution of waypoints for a current obstacle environment, and performs a final collision-free path generation from the distribution of waypoints.

Discussion of the Related Art

The use of industrial robots to repeatedly perform a wide range of manufacturing, assembly and material movement operations is well known. A variety of techniques exist for teaching a robot to move from a start point to a goal point. However, when obstacles exist between the start point and the goal point, existing path generation techniques all exhibit certain shortcomings.

One known technique for path generation is to use a teach pendant. The teach pendant communicates with the robot controller and is operated by a human operator. The teach pendant is used by the operator to instruct the robot to make incremental moves—such as "jog in the X-direction" or "rotate gripper about local Z-axis". The robot motions are recorded by the robot controller and stored as a motion program. These types of teach pendant commands and robot movements are fine for simple paths with straightforward motions and few or no obstacles. However, the use of a teach pendant for programming a robot in a complicated obstacle environment is often found to be difficult, error-prone and time-consuming.

Another known technique for path generation is to use a collaborative robot in a "lead-through" process. In the lead-through process, a human operator manually grasps the tool or workpiece at the end of the robot arm and moves the tool or workpiece from the start point to the goal point. The lead-through process has the advantage of capturing human expertise in selecting a path, and also allows collision avoidance evaluation of all parts of the robot during the motion-which is critical in applications where any part of the robot (not just the tool or workpiece) might make contact with an obstacle. Unfortunately, it may be difficult or impossible for the human operator to manipulate the entire robot (including all intermediate joint positions) to avoid collisions when the obstacle environment is complex.

Robot teaching by human demonstration is also known, where a human demonstrator manually grasps and moves a workpiece from the start position to the goal position. However, path generation by human demonstration may lack the positional accuracy needed for precise movement of the workpiece, and path generation by human demonstration does not account for collision avoidance of the robot arm itself with obstacles in the workspace.

Automatic path generation techniques are also known—where the start and goal points are provided, along with geometric definition of the obstacles in the environment—and a path generation computation is attempted. These automatic path generation techniques also suffer certain shortcomings, which are discussed further below.

In light of the circumstances described above, there is a need for an improved robot path generation technique which captures the essence of the skills taught by human-generated paths, and applies those skills to generate a collision-free path in a new obstacle environment.

SUMMARY

The present disclosure describes a method for robot path planning using skills extracted from human-taught motion programs applied to a new obstacle environment. A three-dimensional convolutional neural network is used to extract features characterizing an obstacle environment, where the feature vector representation of the obstacles overcomes problems encountered when using point cloud obstacle data. The obstacle feature data and robot path start and goal points are provided to an encoder/decoder neural network system which is trained to extract skills from a database of human-generated motion programs. The encoder/decoder neural network produces a distribution of waypoints for the current obstacle environment and start/goal points. The distribution of waypoints is used to perform a final collision-free path generation using either a rapidly-exploring random tree (RRT) technique or an optimization-based technique.

Additional features of the presently disclosed devices and methods will become apparent from the following description and appended claims, taken in conjunction with the accompanying drawings.

BRIEF DESCRIPTION OF THE DRAWINGS

FIG. 8 is a flowchart diagram of a method for human skill based robot path generation, including obstacle feature extraction and human skill extraction in a neural network system, and collision-free path generation from a distribution of waypoints, according to an embodiment of the present disclosure.

DETAILED DESCRIPTION OF THE EMBODIMENTS

The following discussion of the embodiments of the disclosure directed to a method for human skill based robot path generation is merely exemplary in nature, and is in no way intended to limit the disclosed devices and techniques or their applications or uses.

It is well known to use industrial robots for a variety of manufacturing, assembly and material movement operations. It has long been an objective to develop simple techniques for generating robot motion programs which are efficient and which avoid collisions with any obstacles present in the work environment. However, existing path generation techniques all exhibit certain shortcomings.

It is recognized that human intuition and visualization are powerful tools which can be employed in robot path generation. As such, various techniques have been developed for path generation using human input. These techniques—including teach pendant manipulation, collaborative robot lead-through and human demonstration of workpiece pick and place operations—can be very effective in path generation for certain types of operations. However, when a complex obstacle environment is involved—such as a robot mounted on one side of a workpiece and having to reach through an aperture in the workpiece to perform an operation on the other side—these existing path generation techniques often fall short of the capabilities required to generate an efficient and collision-free path.

Automatic path generation techniques are also known—where the start and goal points are provided, along with geometric definition of the obstacles in the environment—and an automated computation of a collision-free path is attempted. Two such techniques, along with their limitations, are discussed below.

Figure 1A:
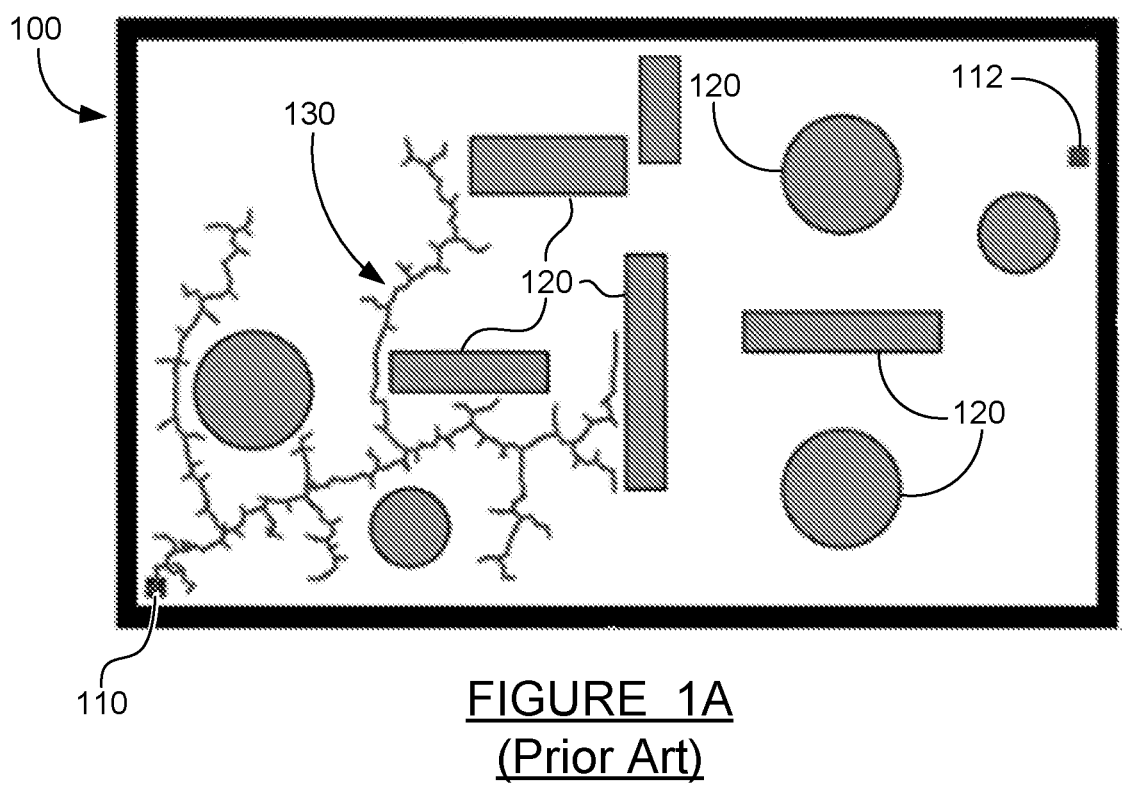
FIG. 1A is an illustration of an automatic path generation using a rapidly-exploring random tree (RRT) technique.
Figure 1B:
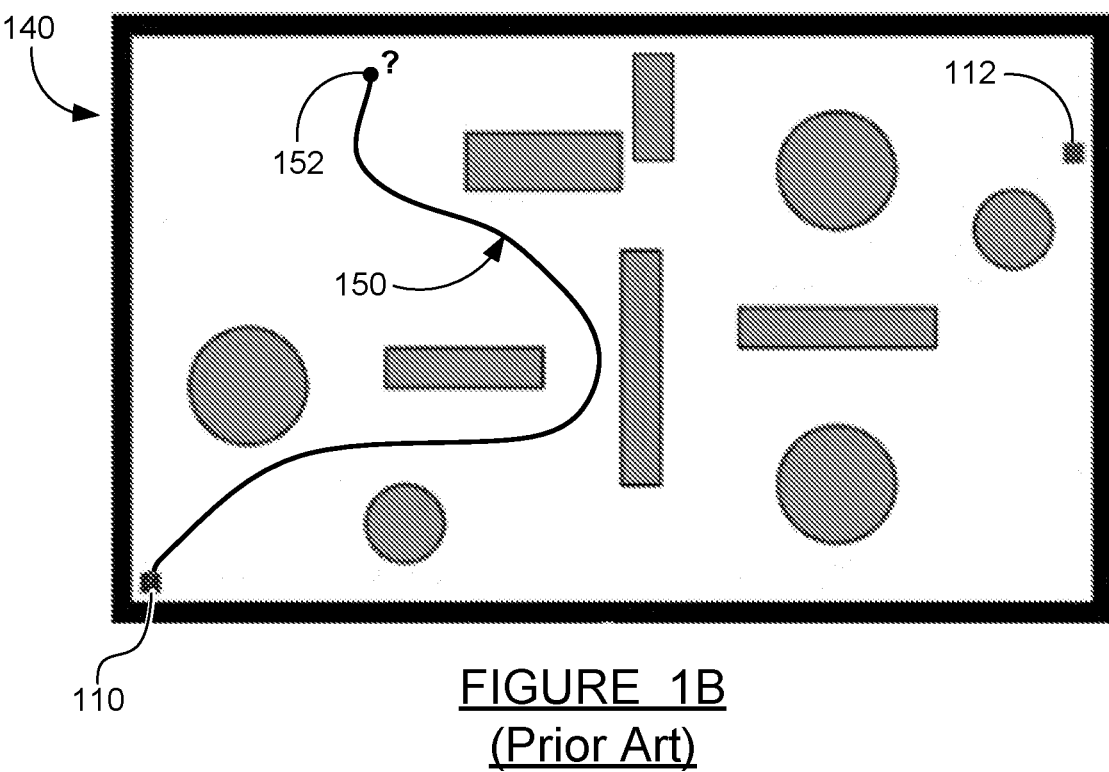
FIG. 1B is an illustration of an automatic path generation using an optimization-based technique, as known in the art.

FIG. 1A is an illustration of an automatic path generation using a rapidly-exploring random tree (RRT) technique, and FIG. 1B is an illustration of an automatic path generation using an optimization-based technique, as known in the art. In FIG. 1A, an RRT path generation scenario 100 is illustrated. In the scenario 100, a collision-free path is desired from a start point 110 to a goal point 112. Numerous obstacles 120 exist in the workspace between the start point 110 and the goal point 112. An RRT-generated path 130 is depicted partway through its growth process.

As known by those skilled in the art, the RRT method proposes a new waypoint within an incremental distance from a previous path point (or the start point 110), and evaluates the feasibility of a path segment from the previous path point to the new waypoint. If the path segment is collision-free, then the new waypoint is added to the path, and another new waypoint is evaluated. Many branches develop in the RRT path, and eventually a complete path from the start point 110 to the goal point 112 may be found. However, RRT-generated paths are characteristically unnatural in shape, having many short path segments which zig-zag back and forth. For this and other reasons, paths generated using a pure RRT technique are often found to be less desirable than paths generated in other ways.

In FIG. 1B, a scenario 140 contains the same start point 110 and goal point 112, and the same environment of obstacles 120 as in the scenario 100 discussed above. In the scenario 140, an optimization-based technique is used to attempt to find a collision-free path from the start point 110 to the goal point 112. A path 150 extends from the start point 110 partway through the obstacle environment of the scenario 140. Optimization-based path generation methods can produce paths using an objective function which encourages smoothness and efficiency in path routing, and constraints which ensure collision avoidance throughout the path. However, in a complex obstacle environment, optimization-based methods may fail to find a feasible solution. This situation is depicted in the scenario 140, in which case the path 150 extends to a point 152 where it is stuck behind two of the obstacles 120 and hemmed in by an outer boundary of the workspace.

The techniques of the present disclosure have been developed to overcome the limitations and shortcomings of the existing path generation methods discussed above. The techniques discussed below capture the skills embodied in human-generated paths, while using advanced computations to apply the human path generation skills to find a collision-free path through a new obstacle environment.

Figure 2:
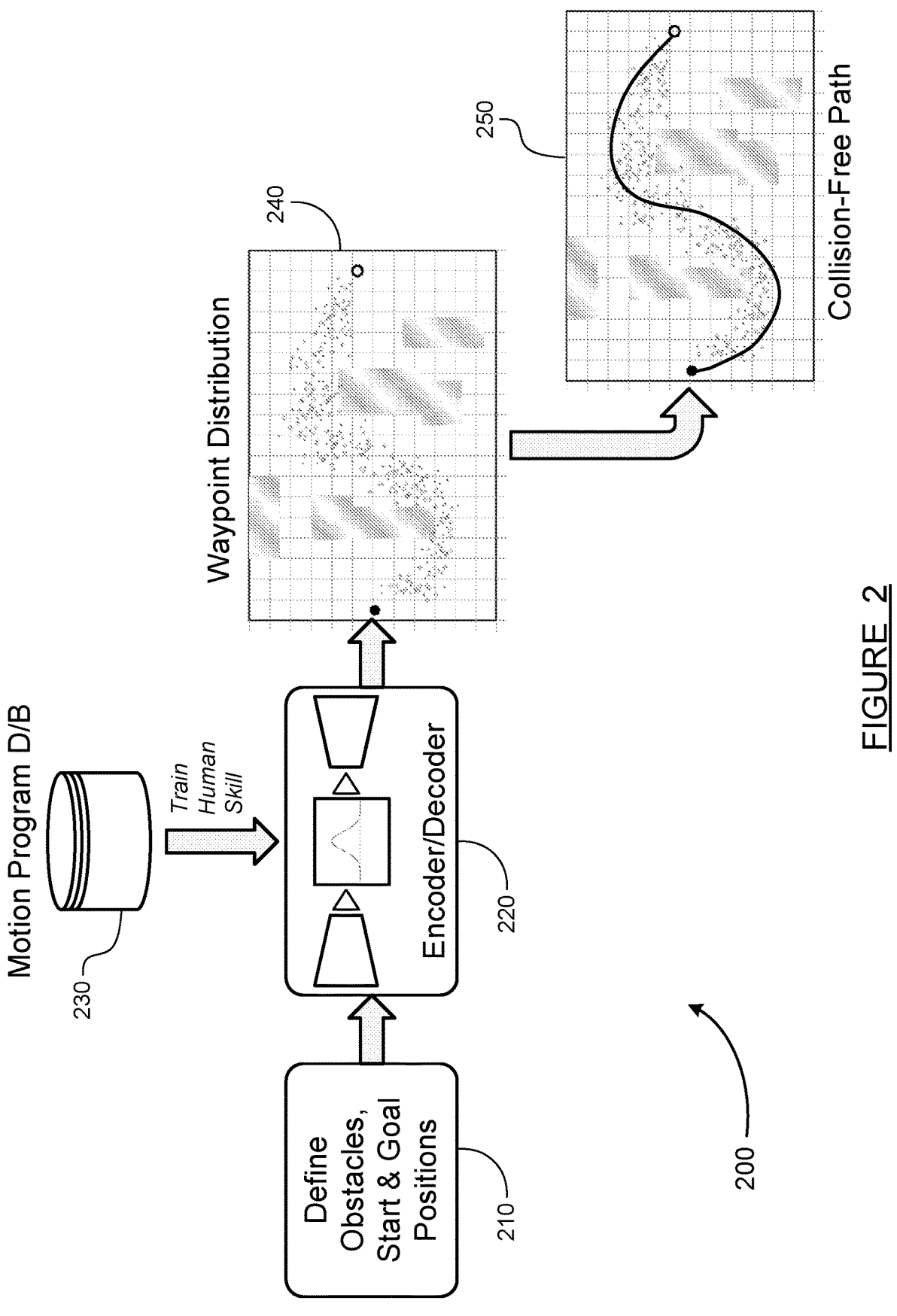
FIG. 2 is a block diagram illustration of a system for human skill based robot path generation, according to an embodiment of the present disclosure.

FIG. 2 is a block diagram illustration of a system 200 for human skill based robot path generation, according to an embodiment of the present disclosure. At a block 210, obstacle data for a workspace environment are provided, along with start and goal point locations for a new path to be computed. These inputs correspond to the scenarios 100 and 140 depicted in FIGS. 1A/1B and discussed earlier. Instead of computing a path directly, the inputs from the block 210 are provided to an encoder/decoder block 220. The encoder/decoder block 220 includes encoder and decoder neural networks configured to extract human skills from existing robot motion programs, and apply those skills to compute a path in a new obstacle environment. The encoder/decoder block 220 is discussed in detail below.

A database 230 of existing motion programs is also provided to the encoder/decoder block 220. The database 230 includes robot motion programs which were generated using any technique in which human skill is incorporated. These techniques include the use of a teach pendant to define a robot motion program as a sequence of incremental movements, the use of a collaborative robot by a human in a "lead-through" motion capture technique, and human demonstration of a workpiece pick and place operation, for example. The database 230 includes a plurality of human-taught motion programs (robotic paths) and, for each motion program, a definition of the obstacle environment corresponding to the robotic path. In this way, the database 230 characterizes the manner in which a human expert solves a motion programming problem for various obstacle environments. That is, the database 230 captures the human skills such as path curvatures and obstacle avoidance distances in tracing a path from a start point to a goal point. The database 230 is used to train the encoder/decoder block 220. The human skills embodied in the database 230 are extracted by the encoder/decoder block 220 and ultimately used to generate a path for a new obstacle environment, as discussed below.

The encoder/decoder block 220 produces a waypoint distribution 240 which contains a distribution (sort of a cloud path) of waypoints in a workspace environment containing the obstacles defined in the input block 210. The waypoint distribution 240 is then used to generate a collision-free path 250 in one of two ways. The system 200 captures the path generation skills of a human expert, applies those skills to chart a path through a new obstacle environment, and employs the power of automated path generation techniques, in a manner which overcomes the limitations of existing path generation methods. Each of the elements of the system 200, and their interactions with each other, are discussed further below.

Figure 3:
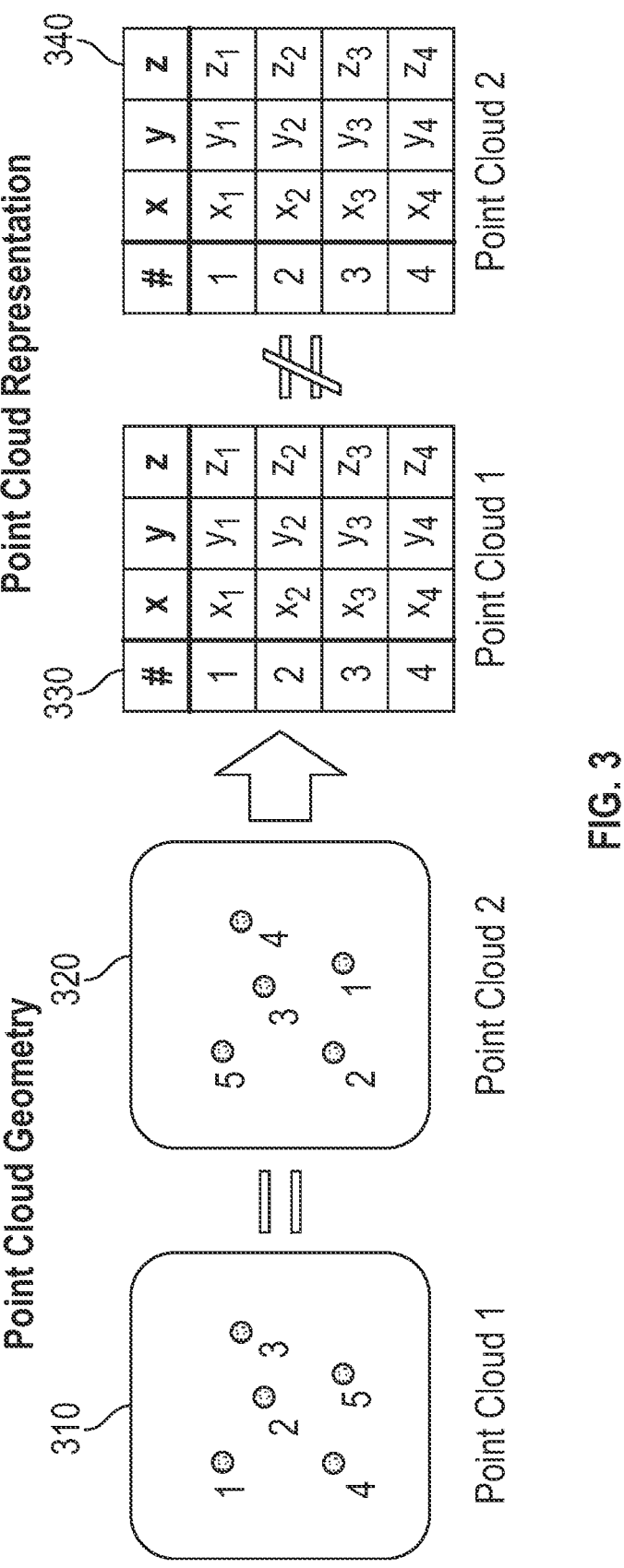
FIG. 3 is an illustration depicting how a point cloud takes on a different mathematical representation when the numbering order of the points in the cloud is changed.

FIG. 3 is an illustration depicting how a point cloud takes on a different mathematical representation when the numbering order of the points in the cloud is changed. Many existing path generation techniques use a point cloud representation of the obstacle environment. As known by those skilled in the art, a point cloud is a set of points representing an object or objects, where the points are typically defined in a three-dimensional (3D) coordinate frame. The points in the point cloud may be located only on exterior surfaces of the object(s), or the points may be located on both the exterior and the interior of the object(s).

Although point clouds are a convenient form of 3D obstacle representation, they exhibit some characteristics which are problematic in subsequent computations where they are used. Consider for example a simple point cloud 310 containing five points in a spatial environment, with the points numbered 1-5. A point cloud 320 includes five points in the spatial environment with identical locations to the points in the point cloud 310, but the points in the point cloud 320 have been numbered 1-5 in a different order. The point cloud 310 corresponds to a coordinate matrix 330, where the point 1 of the coordinate matrix 330 has coordinates $(x_1, y_1, z_1)$, and so forth. The point cloud 320 corresponds to a coordinate matrix 340, where the point 1 of the coordinate matrix 340 has coordinates $(x_1, y_1, z_1)$, which are different than $(x_1, y_1, z_1)$ of the coordinate matrix 330. In other words, even though the point cloud 310 and the point cloud 320 define five identically-located points in space, the coordinate matrix 330 is completely different from the coordinate matrix 340. Thus, point clouds do not exhibit permutation invariance; that is, the point cloud definition varies based on the order in which the items are listed.

Another characteristic of point clouds is that they do not exhibit transformation invariance. That is, a point cloud representing an object which is oriented one way (e.g., "right side up") is entirely different than a point cloud representing the same object oriented another way (e.g., "upside down"). Both permutation variance and transformation variance create problems and inefficiencies in the use of point clouds for obstacle definition, because both of these phenomena make it difficult or impossible for objects to be recognized and processed efficiently, particularly in machine learning systems.

Figure 4:
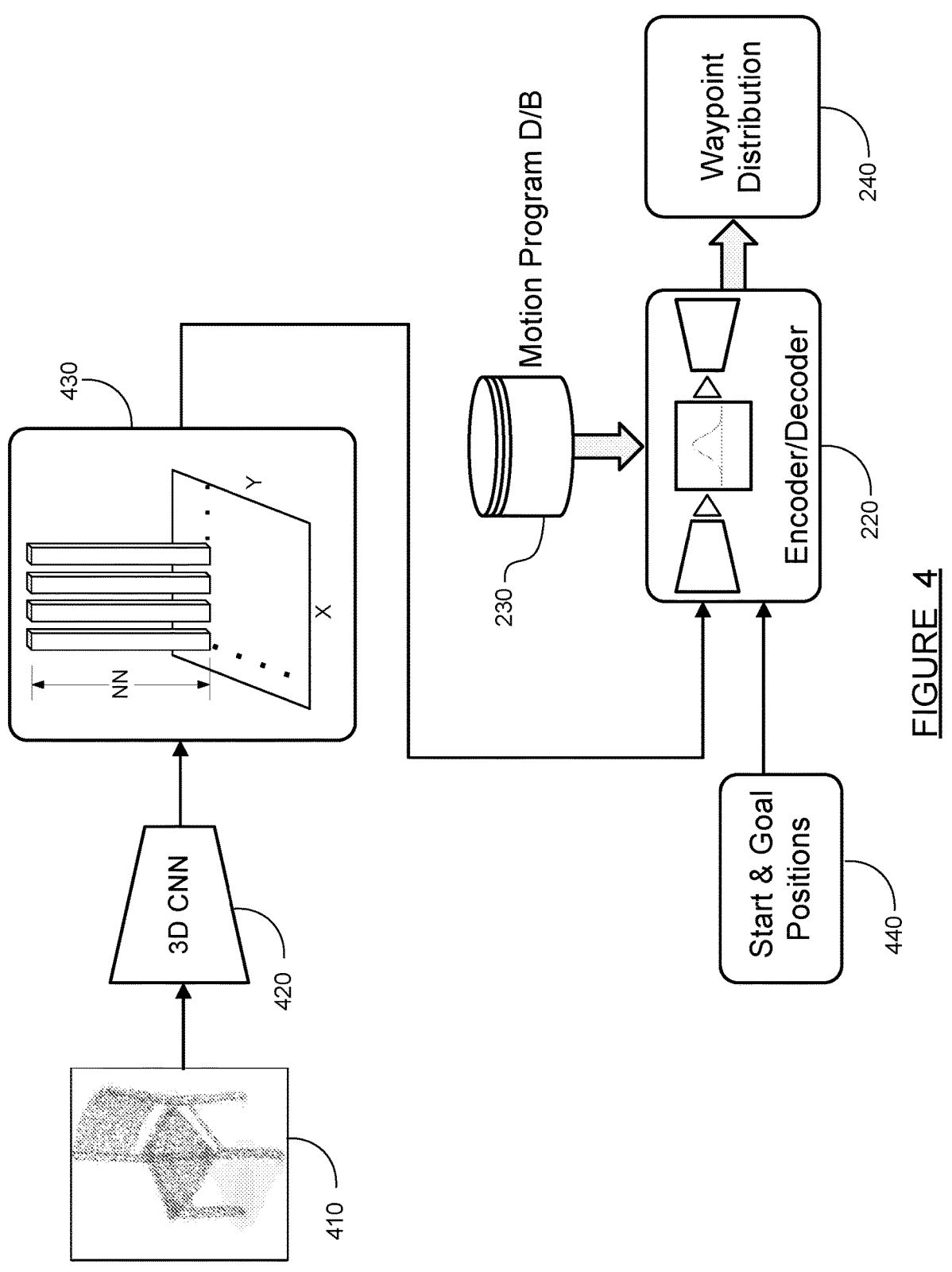
FIG. 4 is a block diagram illustration depicting extraction of features from obstacle point cloud data, and using the feature vector data as input for human skill based path generation, according to an embodiment of the present disclosure.

FIG. 4 is a block diagram illustration depicting extraction of features from obstacle point cloud data, and using the feature vector data as input for human skill based path generation, according to an embodiment of the present disclosure. In FIG. 2, the block 210 was shown as providing obstacle data input, along with definition of start and goal point positions. FIG. 4 illustrates how the obstacle data is provided as input to the system of FIG. 2 in a manner which overcomes the problems with point cloud data discussed above.

A point cloud 410 represents an object (a chair in this instance, which may be considered an obstacle), in a known manner and as discussed above. A 3D convolutional neural network (CNN) 420 is used to extract features from the obstacle point cloud 410. Feature extractors—such as the CNN 420—take a point cloud or other data (such as a solid model or an image) as input and provide as output a set of feature vectors which characterize the input. The feature extractor CNN 420 dramatically reduces the amount of data required for subsequent processing—by replacing a point cloud having thousands of point coordinates with a set of numerically-defined feature vectors which may number in the hundreds. The feature extractor CNN 420 also overcomes the problems inherent in point cloud obstacle definition discussed above—by using a feature vector representation of the obstacle rather than the raw point cloud data.

As understood by those skilled in the art, a CNN is a common architecture used for feature extraction, and in fact, pre-trained feature extractor CNNs are available where the network structure is fixed, including the number of layers and the size of each layer output, and the network parameters are trained. The feature extractor CNN 420 may be this type of a pre-trained feature extractor CNN. The ultimate output of the CNN 420, to be used as input to the encoder/decoder block 220 (from FIG. 2), is a set of feature vectors shown in block 430. The output depicted in the block 430 is an array of feature vectors, the array having a size of "X" by "Y", each feature vector having a dimension of $\{NN \times 1\}$. The number of feature vectors $(X \cdot Y)$ and the dimension of each feature vector may be selected as suitable for a particular application, and corresponds with the design of the CNN 420.

The feature vectors from the block 430, characterizing the obstacles from the point cloud 410, are provided as input to the encoder/decoder block 220 shown earlier in FIG. 2. The start and goal point positions for the robot path to be generated, in a block 440, are also provided as input to the encoder/decoder block 220. The encoder/decoder block 220, after being trained with the database 230 of existing motion programs, uses the obstacle and start/goal inputs from the blocks 430 and 440 to compute the waypoint distribution 240 described earlier with respect to FIG. 2. The training and the computation of the waypoint distribution are discussed below.

Figure 5:
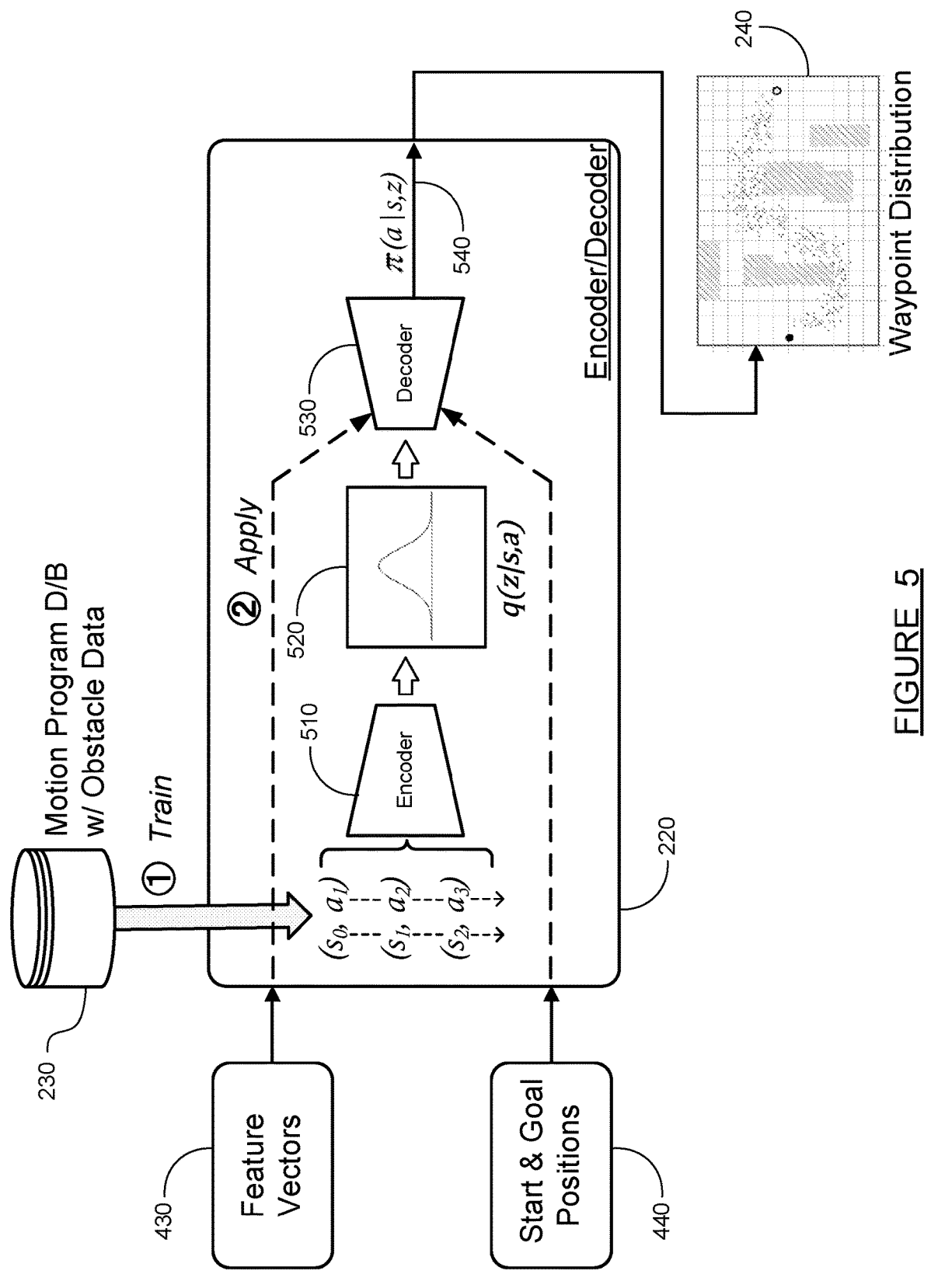
FIG. 5 is a block diagram illustration depicting how encoder and decoder neural networks are used to create a distribution of waypoints for a robot path with human skill extraction, using start and goal points and obstacle feature data as input along with a database of human-generated paths for training, according to an embodiment of the present disclosure.

FIG. 5 is a block diagram illustration depicting how encoder and decoder neural networks are used to create a distribution of waypoints for a robot path with human skill extraction, according to an embodiment of the present disclosure. The encoder/decoder block 220 is shown in an enlarged fashion in FIG. 5, receiving the obstacle feature vectors 430 and the start and goal points in the block 440 as input. The database 230 of human-generated motion programs, with corresponding obstacle data, is also provided as input. The obstacle and motion data from the human-generated path database is used to train encoder and decoder neural networks which capture the human skill, where the encoder defines a Gaussian distribution of probabilities associated with a set of state (start and goal point positions, obstacle) and action (motion) data, and the decoder determines actions (waypoints) associated with a set of state (start and goal point positions, obstacle) data and corresponding probability.

The encoder/decoder block 220 includes an encoder neural network 510. The data from the database 230 of human-generated motion programs provides a sequence of corresponding "state" and "action" data-$(s_0, a_1)$, $(s_1, a_2)$, $(s_2, a_3)$, and so forth-which is used to train the encoder neural network 510. Each of the "states" $s_i$ is an obstacle characteristic from one of the motion programs in the database 230 along with start and goal point positions, and the corresponding "action" $a_{i+1}$ is the motion characteristic (waypoint from the motion program) which resulted from the state. The encoder neural network 510 produces a distribution q (shown at 520) of probabilities z associated with a state s and an action a. The distribution $q(z|s, a)$ shown at 520 captures the human skill from the human-generated motion programs in the database 230. The database 230 of human-generated motion programs, including both obstacle environment data and corresponding human-generated motion programs, serves as labeled data for training the encoder neural network 510 and a decoder neural network 530 to exhibit the desired path generation behavior.

After training, the decoder neural network 530 is then used to determine an action a corresponding with a state s and a probability z. This is done using a probability function $\pi(a|s, z)$ as shown on line 540. The decoder neural network 530 receives as input the feature vectors 430 defining the obstacle environment for the path to be generated, along with the start and goal point positions of the path to be generated from the block 440. Then, using the probability function $\pi$, the decoder neural network 530 computes a set of actions a (waypoints) corresponding with states s (start and goal point positions, and obstacles) and probabilities z. This results in the waypoint distribution 240—which is not a complete and definitive path (motion program)—but is rather a distribution of waypoints based on the obstacle environment of the path being generated and the probabilities encoded in the human skill from the database 230.

Training of the encoder/decoder block 220 is accomplished using the database 230 of human-generated motion programs which includes the obstacle environment for each of the motion programs. Using the database 230 as a labeled data set for training, the encoder neural network 510 learns the distribution q which captures the human skill, while the decoder learns the probability function $\pi$ which produces a waypoint distribution along the motion program which was used as input. Training of the encoder neural network 220 may be accomplished using a known loss function approach, or another technique as determined most suitable.

To summarize what was discussed above; the database 230 of human-generated motion programs (which includes the obstacle environment for each of the motion programs) is used to train the encoder neural network 510 and the decoder neural network 530 to capture the human path-generation skill applied to many different obstacle scenarios. Then, once trained, the decoder neural network 530 receives the start/goal positions and the obstacle environment (obstacle feature vector data) for a new path to be generated and, using the distribution q, computes the probability function $\pi$ which produces the waypoint distribution 240, where the waypoint distribution 240 is a set of points along a path which extends from the start point to the goal point while generally avoiding the obstacles along the way.

In experimental evaluation of the presently disclosed methods, the training dataset (in the database 230) included 300 motion programs (each with the corresponding obstacle environment). This training dataset demonstrated the ability to adequately train the encoder/decoder block 220. After training with the 300 motion program dataset, a test dataset of 50 obstacle environments was provided for evaluation, where a waypoint distribution was computed for each of the 50 examples in the test dataset. Over half of the test examples resulted in a waypoint distribution which was collision-free throughout the obstacle environment of the particular example. However, the remainder of the test examples resulted in a waypoint distribution which included some waypoint interference with obstacles. Thus, although the waypoint distribution 240 does a very good job of capturing the general motions which are representative of the human skill in the training database, an additional method step is needed in order to produce a reliably collision-free path for each start/goal constraint and obstacle environment.

Figure 6:
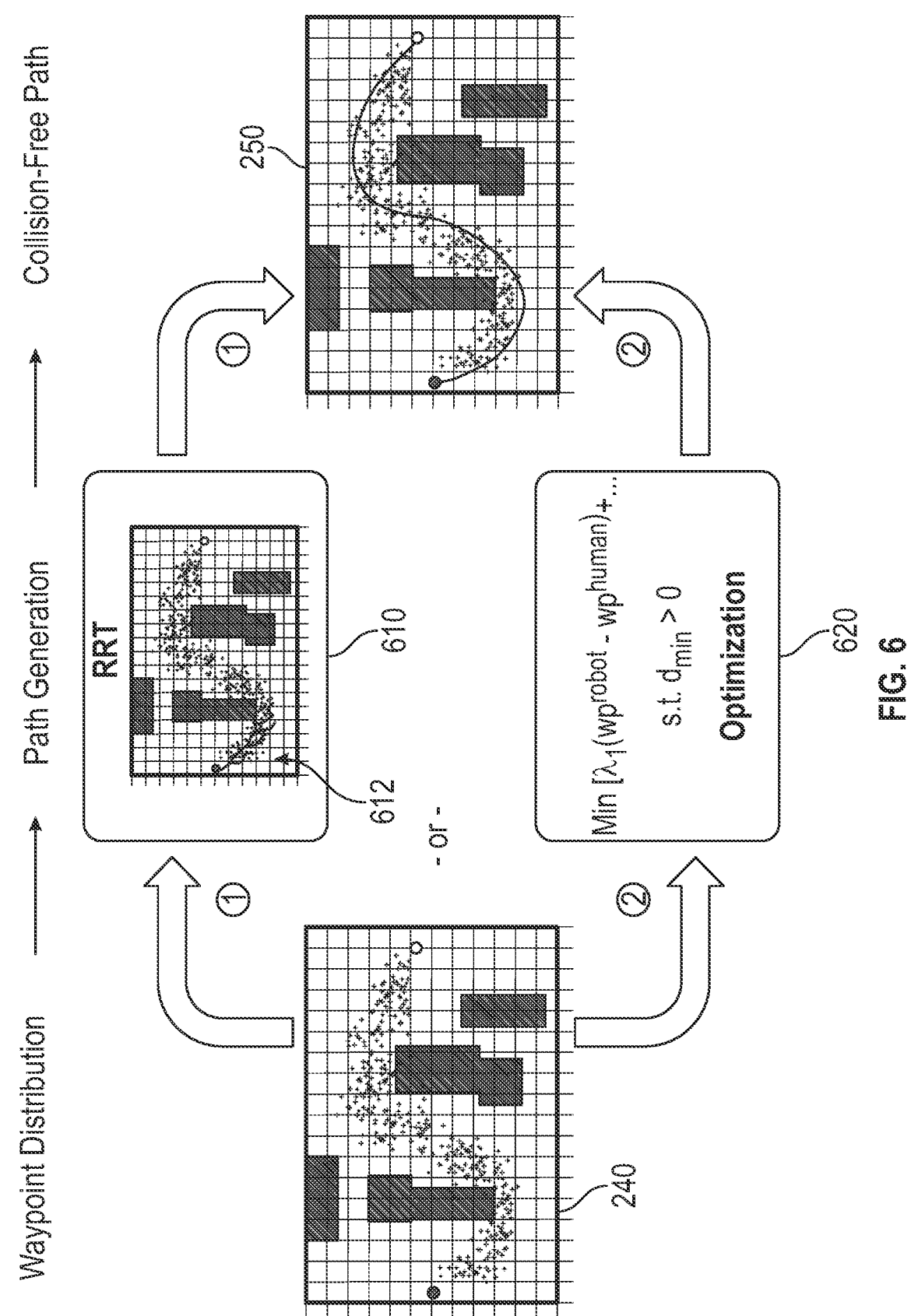
FIG. 6 is a block diagram illustration depicting how the distribution of waypoints from FIG. 5 is used for collision-free path generation using either an RRT or an optimization-based technique, according to embodiments of the present disclosure.

FIG. 6 is a block diagram illustration depicting how the distribution of waypoints from FIG. 5 is used for collision-free path generation using either an RRT or an optimization-based technique, according to embodiments of the present disclosure. As explained above, the waypoint distribution 240 is not guaranteed to be collision-free along the path from the start point to the goal point. The presently disclosed technique therefore adds a method step of collision-free path generation from the waypoint distribution 240.

A first technique for collision-free path generation from the waypoint distribution 240 uses the RRT method. This is shown on the upper track (①) in FIG. 6. In block 610, the waypoint distribution 240 is shown, along with the beginning of an RRT path indicated at 612. Unlike conventional RRT path generation as discussed with respect to FIG. 1A, the path generation technique of the present disclosure does not randomly select proposed new waypoints from anywhere in the workspace. Instead, the disclosed path generation technique selects proposed new waypoints only from the waypoint distribution 240. This ensures that the RRT-generated path follows the path laid out by the encoder/decoder block 220, which captures the human path-generation skills. It also causes the RRT path generation to be very efficient, because most of the proposed new waypoints will be collision-free, and an RRT path will therefore quickly be constructed from the start point to the goal point, following the human skill-based waypoint distribution, while avoiding all obstacles along the way (because each RRT path segments checks for collision avoidance). The resulting collision-free path 250—after all unproductive branches have been pruned away—is shown at the right of FIG. 6, superimposed on the waypoint distribution 240.

A second technique for collision-free path generation from the waypoint distribution 240 uses an optimization computation. This is shown on the lower track (②) in FIG. 6. In block 620, the waypoint distribution 240 is used in the optimization computation as follows. The optimization model is defined using an objective function which penalizes deviation from the waypoint distribution, along with an inequality constraint which ensures that the path remains collision-free. A preferred, non-limiting embodiment of the objective function is defined below in Equation (1):

$$\min\left[\lambda_1\left(wp^{robot} - wp^{human}\right) + \lambda_2\sum d_i + \lambda_3\sum t_i\right] \tag{1}$$

Where $wp^{robot}$ is a waypoint of the robot in the path which is being computed, $wp^{human}$ is the waypoint distribution 240 which is provided from the encoder/decoder block 220 and captures the human path-generation skill, $\Sigma d_i$ is the total distance of the generated path (a summation of distances for each path point i), $\Sigma t_i$ is the total cycle time of the robot motion using the generated path, and $\lambda_1$-$\lambda_3$ are weighting factors. The first term of the objective function in Equation (1) serves to minimize the deviation of the computed robot path from the waypoint distribution 240, where the center or average position of the waypoint distribution is preferably used in this calculation. The weighting factors $\lambda_1$-$\lambda_3$ can be selected to achieve the desired path generation performance in any given application.

Along with the objective function of Equation (1), the optimization model includes at least one constraint, such as an inequality constraint which computes a minimum distance between the robot and any obstacle for each iteration of waypoint computation, and the constraint dictates that the minimum distance is greater than a predefined threshold value (the threshold value may be zero, or some positive distance value such as 15 mm). In this way, each robot path point i is required to be collision-free before it is added to the path. In addition to the collision avoidance inequality constraint, other constraints may be included in the optimization model-such as constraints on robot joint positions which ensure that the robot configuration at each path point i is feasible.

The optimization model defined above ensures that the generated path follows the waypoint distribution laid out by the encoder/decoder block 220, which captures the human path-generation skills. The optimization model also causes the generated path to be very efficient, while avoiding all obstacles along the way. The resulting collision-free path from the optimization-based path generation is also shown at 250 in FIG. 6, superimposed on the waypoint distribution 240.

Figure 7:
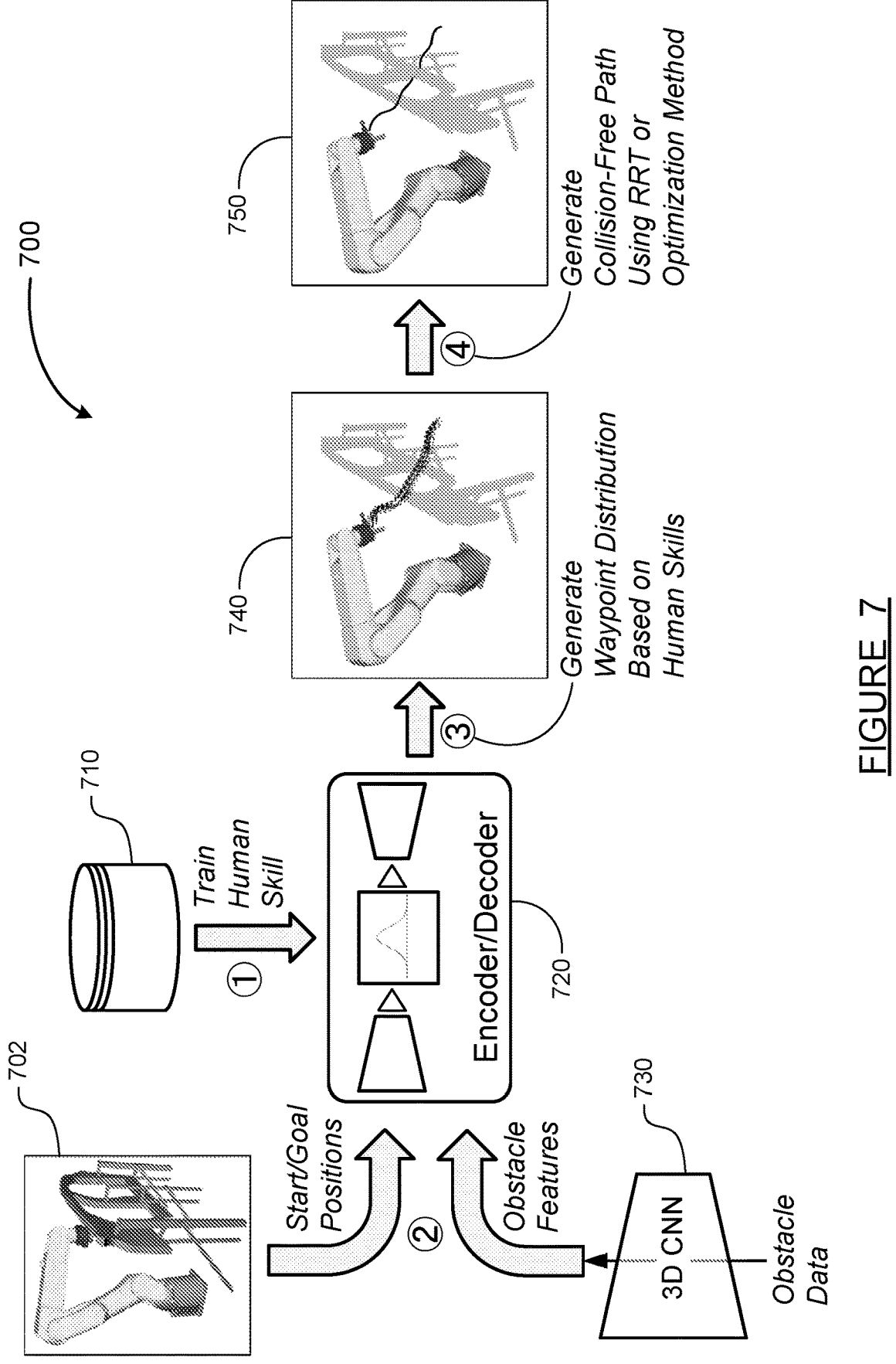
FIG. 7 is a schematic diagram illustration of a system for human skill based robot path generation, depicting robot and obstacle geometries from an example implementation, according to an embodiment of the present disclosure.

FIG. 7 is a schematic diagram illustration of a system 700 for human skill based robot path generation, depicting robot and obstacle geometries from an example implementation, according to an embodiment of the present disclosure. FIG. 7 is provided as a more realistic visual example of how the methods and system discussed above (with respect to FIGS. 2 and 4-6) are applied to an actual robot in a complex 3D obstacle environment—not just tracing a curve through a simple group of 2D obstacles.

In a first step (indicated at (①), a database 710 of human-generated robot motion programs are used to train an encoder/decoder neural network system 720. This step was described in detail with respect to FIG. 5, where the database 710 (equivalent to the database 230) includes many (e.g., hundreds) of motion programs created by a human teaching method, along with the corresponding obstacle data for each motion program, and the data are used to train the encoder/decoder system 720 (the distribution q(z|s, a) and the probability function π(a|s, z)) to emulate human skill in defining path points which avoid obstacles in a spatial environment.

In a second step (indicated at (②), start and goal positions for a new path to be generated, along with the obstacle environment through which the path must be found, are provided to the trained encoder/decoder neural network system 720. Obstacle geometric data are provided to a 3D CNN 730 which extracts obstacle feature data; the obstacle feature data rather than raw obstacle geometry or point cloud data are provided to the encoder/decoder system 720. This step was described in detail with respect to FIG. 4. An illustration of a robot and a door frame are provided in box 702. This depicts an example of the type of actual robot path generation scenario to which the presently disclosed methods and system are applied. In this example, the start point has a tool center point located on the "near" side of the door frame (the same side that the robot base is mounted on), while the goal point has the tool center point located on the "far" side of the door frame. This would be representative of a type of path which needs to be generated for a spot welding robot, for example, where welding operations are required on both sides of the workpiece (door frame). Furthermore, the door frame itself is an obstacle that must be avoided by the robot. There may also be other obstacle in the workspace environment.

In a third step (indicated at (③), the start and goal positions and the obstacle feature data are used by the decoder neural network to generate a waypoint distribution 740. This step was also described earlier with respect to FIG. 5. The waypoint distribution 740 includes a distribution of points computed by the probability function π based on the start/goal positions and the obstacle environment. In the example shown, the waypoint distribution 740 follows a path through an opening or aperture in the door frame. The waypoint distribution 740 embodies the human skill for collision avoidance path generation which is captured in the encoder/decoder system 720. The waypoint distribution 740 is not guaranteed to be collision-free, so a final step of path generation is included.

In a fourth step (indicated at (④)), a collision-free path 750 is generated from the waypoint distribution 740. This step was described earlier with respect to FIG. 6. The collision-free path 750 may be computed from the waypoint distribution 740 using either the RRT method or the optimization-based method, as discussed earlier. Both the RRT method and the optimization-based method use the waypoint distribution 740 in the selection of points along the final collision-free path.

Referring to the illustrations provided in FIG. 7, a few important points are to be observed. First, obstacles involved in robot motion programming are in general 3D objects which may have complex shapes (such as the car door frame), and may also include fixtures and platforms having simpler prismatic shapes. In addition, each waypoint or robot path point is not just a point in 2D or 3D space, but rather is defined by a complete robot configuration, including positions of all joints of the robot arm. As such, the collision avoidance calculations (in either the RRT method or the optimization-based method for path generation) compute minimum 3D distances between all parts of the robot arm (including the tool, and including any workpiece which the tool may be grasping) and all of the obstacles. The minimum distance calculations may be performed in any suitable fashion-such as using a signed distance field method, or other methods as appropriate. FIG. 7 depicts the complexities actually involved in all of the data and computations, whereas earlier figures depicted simplified examples for conceptual explanation.

FIG. 8 is a flowchart diagram 800 of a method for human skill based robot path generation, including obstacle feature extraction and human skill extraction in a neural network system, and collision-free path generation from a distribution of waypoints, according to an embodiment of the present disclosure. At box 802, a training database of human-generated motion programs is provided. This is the database 230 (or 710) discussed earlier-which includes robot motion programs which were generated using any technique in which human skill is incorporated, such as the use of a teach pendant to define a robot motion program as a sequence of incremental movements, the use of a collaborative robot by a human in a "lead-through" motion capture technique, and human demonstration of a workpiece pick and place operation, for example. The database 230 includes a plurality of human-taught motion programs (robotic paths) and, for each motion program, a definition of the obstacle environment corresponding to the robotic path.

At box 804, the training database is used to train an encoder/decoder neural network system. As discussed previously, the encoder/decoder neural network system (block 220) learns to encode or extract human skill for motion program generation in the face of an obstacle environment. The training teaches the encoder/decoder neural network system (via the distribution q(z|s, a) and the probability function π(a|s, z)) to emulate human skill in defining path points which avoid obstacles in a spatial environment.

At box 806, start and goal positions and obstacle feature data are provided for a new path to be generated. In a preferred embodiment, a 3D convolutional neural network (3D CNN) is used to extract feature vector data from obstacle 3D geometry data (e.g., point cloud or solid model).

At box 808, a waypoint distribution is computed for the new path by the encoder/decoder neural network system. Specifically, the trained decoder neural network uses the probability function $\pi(a|s, z)$ to compute the waypoint distribution based on the start and goal positions and obstacle feature data for the new path. Because the decoder neural network is trained in conjunction with the encoder neural network which encodes the human skill in the distribution q, the resulting waypoint distribution emulates the human skill in defining path points which navigate around obstacles in a spatial environment.

At box 810, a collision-free path is generated from the waypoint distribution. The collision-free path generation uses the waypoint distribution for guidance and includes a complete interference check analysis (for the entire robot) at each path point. The collision-free path may be generated using the RRT method at box 812, or the optimization-based method at box 814. The resulting collision-free path embodies the human skill for finding a path through an obstacle environment as taught by the training database. The collision-free path is a complete robot motion program (defining all joint positions at each path point), or may be readily converted to a complete motion program by way of inverse kinematic calculations as understood by those skilled in robotics.

Throughout the preceding discussion, various computers and controllers are described and implied. It is to be understood that the software applications and modules of these computer and controllers are executed on one or more computing devices having a processor and a memory module. In particular, this includes the processors in a computer or a robot controller, where the controller/computer are configured to perform the human skill based path generation computations in the manner discussed above. The computing device(s) may include specialized computing devices configured specifically for execution of the 3D CNN and/or the encoder/decoder neural network system.

As outlined above, the disclosed techniques for human skill based robot path generation provide several advantages over existing robot path generation methods. The disclosed techniques capture the intuitiveness of human path generation in a trained neural network, use a feature vector representation of obstacles for improved consistency, apply the human skills in a waypoint distribution generation for a new path, and perform a path generation from the waypoint distribution to ensure the final path is collision-free.

While a number of exemplary aspects and embodiments of human skill based path generation have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for human skill based robot path generation, said method comprising:

providing a training database including a plurality of human-generated robot motion programs, including data defining obstacles which are avoided during robotic execution of each motion program;

training an encoder/decoder neural network system, including an encoder neural network and a corresponding decoder neural network running on a computing device, using the training database;

providing obstacle feature data and start and goal positions for a new path to the encoder/decoder neural network system;

computing a waypoint distribution for the new path by the encoder/decoder neural network system, where the waypoint distribution is a set of candidate waypoints for the new path;

generating the new path based on the waypoint distribution, where the new path defines motions for a robot to move a tool center point from the start position to the goal position, including performing a robot-obstacle collision avoidance calculation for each path point;

sending motion commands to the robot, by a controller, which cause the robot to move the tool center point along the new path; and executing the motion commands by the robot.

2. The method according to claim 1 wherein the training database includes robot motion programs generated by one or more method selected from a group comprising; programming by a human-operated teach pendant, path demonstration by human lead-through of a collaborative robot, and demonstration of a robotic operation by human grasping and manipulation of a tool or workpiece.

3. The method according to claim 1 wherein the encoder neural network determines a distribution of probabilities associated with states and actions, where the states and actions are represented by the obstacles and corresponding steps in the motion programs in the training database.

4. The method according to claim 3 wherein the decoder neural network determines a probability function of actions corresponding with states and probabilities, where the actions are defined as the candidate waypoints in the waypoint distribution.

5. The method according to claim 4 wherein training the encoder/decoder neural network system includes training the neural network system with the training database as a labeled training dataset, causing the encoder neural network to learn the distribution and the decoder neural network to learn the probability function which capture human path generation skill from the human-generated motion programs in the training database.

6. The method according to claim 1 wherein providing obstacle feature data includes providing a point cloud or solid model representation of obstacles in a workspace of the new path to a three-dimensional convolutional neural network (3D CNN), extracting feature vectors characterizing the obstacles by the 3D CNN, and providing the feature vectors to the encoder/decoder neural network system.

7. The method according to claim 1 wherein generating the new path based on the waypoint distribution includes a rapidly-exploring random tree (RRT) computation, where proposed waypoints evaluated in the RRT computation are selected from the candidate waypoints in the waypoint distribution.

8. The method according to claim 1 wherein generating the new path based on the waypoint distribution includes an optimization computation, where the optimization computation minimizes an objective function including a term which calculates a distance between the path points in the new path and an average location of the candidate waypoints in the waypoint distribution.

9. The method according to claim 8 wherein the objective function also includes terms which calculate a total distance of the new path and a total time for execution of the new path, and the optimization computation further includes an inequality constraint which dictates that a minimum robot-obstacle distance at each path point is greater than a pre-defined non-negative threshold value.

10. The method according to claim 1 wherein, for each path point in the new path, a robot configuration is computed by inverse kinematics, and the robot configuration is included in the robot-obstacle collision avoidance calculation.

11. A method for human skill based robot path generation, said method comprising:

providing a training database including a plurality of human-generated robot motion programs, including data defining obstacles which are avoided during robotic execution of each motion program;

training an encoder/decoder neural network system, including an encoder neural network and a corresponding decoder neural network running on a computing device, using the training database, where the training causes the encoder neural network to learn a distribution of probabilities associated with states and actions and the decoder neural network determines a probability function of actions corresponding with states and probabilities;

providing obstacle feature data and start and goal positions for a new path to the encoder/decoder neural network system, including providing a point cloud or solid model representation of obstacles in a workspace of the new path to a three-dimensional convolutional neural network (3D CNN), extracting feature vectors characterizing the obstacles using the 3D CNN, and providing the feature vectors to the encoder/decoder neural network system;

computing a waypoint distribution for the new path by the encoder/decoder neural network system, where the waypoint distribution is a set of candidate waypoints for the new path;

generating the new path based on the waypoint distribution, where the new path defines motions for a robot to move a tool center point from the start position to the goal position, where generating the new path includes using either a rapidly-exploring random tree (RRT) computation or an optimization-based computation and includes performing a robot-obstacle collision avoidance calculation for each path point;

sending motion commands to the robot, by a controller, which cause the robot to move the tool center point along the new path; and executing the motion commands by the robot.

12. A system for human skill based robot path generation, said system comprising:

a robot in communication with a robot controller; and a computing device having a processor and memory, said computing device being configured with one or more algorithm to perform steps including;

accessing a training database including a plurality of human-generated robot motion programs, including data defining obstacles which are avoided during robotic execution of each motion program;

training an encoder/decoder neural network system, including an encoder neural network and a corresponding decoder neural network, using the training database;

providing obstacle feature data and start and goal positions for a new path to the encoder/decoder neural network system;

computing a waypoint distribution for the new path by the encoder/decoder neural network system, where the waypoint distribution is a set of candidate waypoints for the new path; and generating the new path based on the waypoint distribution, where the new path defines motions for the robot to move a tool center point from the start position to the goal position, including performing a robot-obstacle collision avoidance calculation for each path point, where the new path is provided to the controller, and the robot executes the new path based on motion commands from the controller.

13. The system according to claim 12 wherein the training database includes robot motion programs generated by one or more method selected from a group comprising; programming by a human-operated teach pendant, path demonstration by human lead-through of a collaborative robot, and demonstration of a robotic operation by human grasping and manipulation of a tool or workpiece.

14. The system according to claim 12 wherein the encoder neural network determines a distribution of probabilities associated with states and actions, where the states and actions are represented by the obstacles and corresponding steps in the motion programs in the training database.

15. The system according to claim 14 wherein the decoder neural network determines a probability function of actions corresponding with states and probabilities, where the actions are defined as the candidate waypoints in the waypoint distribution.

16. The system according to claim 15 wherein training the encoder/decoder neural network system includes training the neural network system with the training database as a labeled training dataset, causing the encoder neural network to learn the distribution and the decoder neural network to learn the probability function which capture human path generation skill from the human-generated motion programs in the training database.

17. The system according to claim 12 wherein providing obstacle feature data includes providing a point cloud or solid model representation of obstacles in a workspace of the new path to a three-dimensional convolutional neural network (3D CNN), extracting feature vectors characterizing the obstacles by the 3D CNN, and providing the feature vectors to the encoder/decoder neural network system.

18. The system according to claim 12 wherein generating the new path based on the waypoint distribution includes a rapidly-exploring random tree (RRT) computation, where proposed waypoints evaluated in the RRT computation are selected from the candidate waypoints in the waypoint distribution.

19. The system according to claim 12 wherein generating the new path based on the waypoint distribution includes an optimization computation, where the optimization computation minimizes an objective function including a term which calculates a distance between the path points in the new path and an average location of the candidate waypoints in the waypoint distribution, where the objective function also includes terms which calculate a total distance of the new path and a total time for execution of the new path, and the optimization computation further includes an inequality constraint which dictates that a minimum robot-obstacle distance at each path point is greater than a predefined non-negative threshold value.

\*   \*   \*   \*   \*